US012266468B2

(12) United States Patent
Scala

(10) Patent No.: US 12,266,468 B2
(45) Date of Patent: Apr. 1, 2025

(54) REDUCING AGEING OF AN INSULATION MATERIAL OF A WINDING, IN PARTICULAR OF AN OIL-IMPREGNATED HIGH-VOLTAGE DEVICE

(71) Applicant: Siemens Energy Global GmbH & Co. KG, Munich (DE)

(72) Inventor: Mario Scala, Graz (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 855 days.

(21) Appl. No.: 17/413,642

(22) PCT Filed: Nov. 28, 2019

(86) PCT No.: PCT/EP2019/082891
§ 371 (c)(1),
(2) Date: Jun. 14, 2021

(87) PCT Pub. No.: WO2020/120149
PCT Pub. Date: Jun. 18, 2020

(65) Prior Publication Data

US 2022/0076882 A1 Mar. 10, 2022

(30) Foreign Application Priority Data

Dec. 12, 2018 (AT) .............................. A 51100/2018

(51) Int. Cl.
*H01F 27/12* (2006.01)
*H01F 27/02* (2006.01)
*H01F 27/32* (2006.01)

(52) U.S. Cl.
CPC ......... *H01F 27/323* (2013.01); *H01F 27/025* (2013.01); *H01F 27/12* (2013.01)

(58) Field of Classification Search
CPC ... H01F 27/323; H01F 27/255; G01R 15/185; H03K 17/90; H03K 17/80;
(Continued)

(56) References Cited

U.S. PATENT DOCUMENTS 3,102,159 A 8/1963 Ford
3,371,299 A * 2/1968 Radkowski ............. H01F 27/12 336/60
(Continued)

FOREIGN PATENT DOCUMENTS

EP 0113496 A1 7/1984
EP 2987171 B1 2/2016
WO WO 2007007143 A1 1/2007

OTHER PUBLICATIONS

Prevost T. A. "Thermically Upgrade Insulation in Transformers"; Proceedings Electrical Insulation Conference and Electrical Manufacturing Expo; pp. 120-125; Oct. 23-26, 2005; 2005.

*Primary Examiner* — Tuyen T Nguyen
(74) *Attorney, Agent, or Firm* — Laurence A. Greenberg; Werner H. Stemer; Ralph E. Locher

(57) ABSTRACT

An assembly includes at least one winding and a housing in which the winding is disposed. The winding has at least one electrical conductor and a cellulosic or cellulose-containing insulation material at least partially surrounds the winding and/or the electrical conductor thereof. The housing is filled with a liquid coolant during operation so that the winding is located in a liquid coolant during operation. In addition to existing cellulose-containing insulation material which encloses the winding and/or the electrical conductor thereof for insulation purposes, the housing and/or a coolant circuit for the coolant contains at least one composition containing chemical compounds for reducing the aging of cellulose-
(Continued)

containing insulation material. A method of reducing the aging of cellulosic insulation material of a winding is also provided.

7 Claims, 1 Drawing Sheet

(58) Field of Classification Search
CPC .. H03K 17/9515; H01H 50/16; H01H 50/163; H01H 50/44; H01C 10/103; H10N 50/10
See application file for complete search history.

(56) References Cited

U.S. PATENT DOCUMENTS

| | | | | |
|---|---|---|---|---|
| 4,424,147 | A | 1/1984 | Kurz et al. | |
| 4,450,424 | A | 5/1984 | Sadler et al. | |
| 5,766,517 | A * | 6/1998 | Goedde | H01B 3/20 252/570 |
| 2013/0243033 | A1* | 9/2013 | Asano, Jr. | H01F 27/008 374/152 |
| 2014/0186576 | A1* | 7/2014 | Harmer | H01B 3/02 428/116 |
| 2014/0191834 | A1* | 7/2014 | MacLennan | H01F 27/255 336/58 |
| 2017/0252721 | A1* | 9/2017 | Jain | B01J 20/28033 |
| 2017/0301449 | A1* | 10/2017 | Michalik | H01F 27/006 |

* cited by examiner

REDUCING AGEING OF AN INSULATION MATERIAL OF A WINDING, IN PARTICULAR OF AN OIL-IMPREGNATED HIGH-VOLTAGE DEVICE

BACKGROUND OF THE INVENTION

Field of the Invention

The invention relates to an assembly comprising at least a winding and a housing within which the winding is disposed, wherein the winding includes at least one electrical conductor, wherein the winding and/or the electrical conductor thereof is at least partly surrounded by a cellulosic insulation material and wherein the housing is filled with a liquid coolant in the state of operation, such that the winding is within a liquid coolant in the state of operation.

The assembly may be a liquid-cooled transformer, preferably a power transformer, or another liquid-cooled electrical assembly, such as an inductor. The winding, for example in the form of a coil, comprises at least one electrical conductor, but may also comprise multiple electrical conductors. The cellulosic insulation material that at least partly surrounds an electrical conductor may, for instance, be paper with which electrical conductor has been wrapped. The cellulosic insulation material that at least partly surrounds the winding typically consists of pressboard material which, especially in the case of thick parts, is formed from bonded pressboard material layers (called "laminated pressboard"). The pressboard material forms the insulation system and keeps the windings in the compressed state. A typical property is impregnation capacity, which relates not just to the insulation liquid but also to other components, for example aging products, that are transferred via the coolant.

The assembly is preferably an oil-impregnated high-voltage device.

The invention also relates to a method of reducing the aging of cellulosic insulation material of a winding, wherein the winding includes at least one electrical conductor, wherein the winding and/or the electrical conductor thereof is at least partly surrounded by a cellulosic insulation material and wherein the housing is filled with a liquid coolant in the state of operation.

The winding(s) and/or its/their respective electrical conductor(s) are generally surrounded by further cellulosic insulation material, and the winding(s) and these parts made of further cellulosic insulation material are typically in a liquid coolant in operation.

DESCRIPTION OF THE RELATED ART

A winding consists of generally tightly wound electrical conductors, wherein heat develops in the electrical conductors of this winding in the state of operation of the winding. In order to avoid buildup of heat within the winding or within the housing, the windings must be cooled by a coolant, for example oil. The coolant also serves to insulate the windings, and is referred to hereinafter as liquid coolant for short.

The aging of transformers or inductors depends not only on temperature but also to a significant degree on the material properties of the materials used. In order to improve the aging properties of the direct conductor insulation, which is usually in the form of paper, the paper is subjected to chemical processes before the wrapping of the conductors, which processes are referred to as thermal stabilization or thermal upgrading. The resulting papers are also referred to as thermally upgraded (TU) papers. These thermally upgraded papers are known and commercially available. There are various methods for production thereof, for example the Insuldur® method.

However, it is unusual to produce insulation parts from pure cellulose, especially pressboard material, in thermally upgraded quality. Pressboard material, which is used in various forms, such as boards or shaped parts fitted to the winding, in transformers and inductors, is therefore subject to aging in unprotected form. The thermally upgraded paper is also subject to aging in operation, but this proceeds more slowly at the same temperature than in the case of paper that has not been thermally upgraded.

SUMMARY OF THE INVENTION

It is thus an object of the invention to provide an assembly and a method that reduce the aging of cellulosic insulation material at least partly surrounding the already installed winding and/or the electrical conductors thereof.

This object is achieved by an assembly, comprising at least a winding and a housing within which the winding is disposed, wherein the winding includes at least one electrical conductor, wherein the winding and/or the electrical conductor thereof is at least partly surrounded by a cellulosic insulation material and wherein the housing is filled with a liquid coolant in the state of operation, such that the winding is within a liquid coolant in the state of operation. It is envisaged here that—in addition to the cellulosic insulation material present that surrounds the winding and/or the electrical conductor thereof for insulation purposes—at least one composition containing chemical compounds for reducing the aging of cellulosic insulation material is present in the housing and/or in a cooling circuit for the coolant.

The thermal aging of insulation material in operation leads to a decrease in mechanical and electrical strength.

Mechanical properties are of great significance for short-circuit resistance. Attention is generally directed here to the winding paper, which is directly heated by the conductor. But the winding paper in places often adjoins spacers which likewise contain cellulose and generally consist essentially of pressboard material, but are subject to a lower temperature than the winding paper for lack of direct contact with the conductor. In addition, the press construction usually also includes pressboard material outside the winding, the capacity of which to maintain the pressure within the winding is essential, and therefore these parts made of pressboard material, especially pressboards, which make a significant contribution to the press construction, should also remain stable. But thermally upgraded pressboard material is not commercially available.

The electrical strength of cellulose per se does not decrease as a result of aging, but aging products such as moisture, acids and dissolved gases in the solid (insulation material) and liquid (coolant) insulation system contribute to deterioration in the electrical properties.

The inventors have observed that, in the operation of a liquid-cooled transformer or a liquid-cooled inductor, chemical compounds for reducing aging diffuse out of cellulosic insulation material, namely out of thermally upgraded paper, into other cellulosic insulation parts that have not been thermally upgraded. The effect of the thermal upgrading effectively diffuses from initially thermally upgraded insulation material (before commissioning of the transformer or inductor) into insulation material that was initially not thermally upgraded. This balancing even takes place when the insulation parts are divided by liquid coolant. This effect is deliberately caused in accordance with the invention in that compositions containing chemical compounds for reducing the aging of cellulosic insulation material are additionally added to the transformer or inductor, in order that these chemical compounds diffuse into that cellulosic insulation material where fewer or even no thermally upgrading components are present. But it is not the additional composition itself that serves for electrical insulation; instead, it merely releases the aging-reducing chemical compounds to the environment, namely to the cellulosic insulation material in particular, which is in contact with the electrical conductor or winding for the purpose of insulation.

The invention thus succeeds in improving the existing cellulosic insulation in the direction of the quality of thermally upgraded paper, and hence of slowing the aging of the insulation.

Even though thermally upgraded paper is already used in the insulation of the winding or of the electrical conductor of the winding, the quality thereof decreases with time, and the invention also increases the quality of this paper again because the proportion of chemical compounds for reducing aging in this paper is increased again.

The solution of the invention also permits retention of the type of coolant used, even if there would be alternative liquid coolants that would have a more favorable effect on the aging of the insulation than the liquid coolant used. Coolants used are generally a mineral oil or an ester. Coolants for cooling of transformers must have good electrical insulation properties. Typically, mineral oils or esters are used for this purpose, although the only useful esters are those that are in liquid form in the state of operation. Such esters are also referred to as ester fluid.

In a preferred embodiment of the assembly of the invention, the composition (containing chemical compounds for reducing the aging of cellulosic insulation material) comprises an additional cellulosic insulation material provided with chemical compounds for reducing the aging of cellulosic insulation material. A solid carrier in the form of insulation material is thus introduced into the housing, which carrier releases the chemical compounds for reducing aging over time, such that these can penetrate into the existing cellulosic insulations and reduce the aging thereof. This solid carrier is generally arranged here such that it does not come into contact with the existing insulation material of the conductor (paper) or of the winding (pressboard material parts, e.g. pressboards) because the chemical compounds are transferred via the coolant.

This composition is preferably a thermally upgraded paper, because it is readily available.

It would also be conceivable that this composition is an addition device by means of which the chemical compounds for reducing the aging of cellulosic material can be added directly to the coolant.

In a preferred embodiment of the assembly of the invention, the composition, for instance thermally upgraded paper, is positioned in the housing where there is a hot region of the coolant in the state of operation, for example disposed in the region of a lid of the housing. There is generally a hot region above and beneath the windings, and hence generally at the top in the housing below a lid of the housing. Owing to the high electrical fields close to the winding, virtually only the lid region is usable (being spaced apart from the winding), and/or the region around the feed for the uncooled coolant from the lid region to the cooling element outside the housing. The higher the temperature of the coolant surrounding the composition, the more quickly the chemical compounds are leached out of the composition and the more quickly these compounds can diffuse into the existing cellulosic insulations.

Alternatively or additionally to the disposing of the composition within the housing, it may also be the case that the composition is disposed in a pipeline in the cooling circuit, which pipeline connects the housing to a cooling element, such as a radiator, disposed outside the housing, in order to supply the cooling element with heated coolant. The composition is thus disposed in the feed for the uncooled coolant from the lid region to the cooling element disposed outside the housing. At that point too, the coolant has an appropriately high temperature to leach the chemical compounds out of the composition. The composition is preferably secured in the pipeline in a region close to the housing.

In order that the composition can be positioned in a very simple and permanent manner within the housing or even within a pipeline, in one embodiment of the invention, the composition, for instance thermally upgraded paper, is held in a holder and the holder is releasably secured within the housing and/or the cooling circuit. It is thus possible, even before the mounting of the composition in the housing or in the cooling circuit, to manufacture appropriate units, for instance in the form of insertable cartridges, where these units form a holder for the composition, and these units are then secured—on appropriate counterparts—at a position in the housing, especially in the lid region, or in the cooling circuit. The holder should be secured at a place that has a high coolant temperature and is favorably accessible from the outside, in order to enable renewal of the material having the thermally upgrading properties. In the lid region, in particular, one option is the region around the feed for the uncooled coolant from the lid region to the cooling element disposed outside the housing, since the coolant flow (generally the oil flow) there ensures good onward conduction of the substances. In the cooling circuit, one option is the feed for the uncooled coolant from the lid region to the cooling element disposed outside the housing. The holder may in any case take the form of a cage containing thermally upgraded paper, for example.

By virtue of the releasable securing, the holder can be exchanged in a simple manner when the chemical compounds for reducing aging therein have been consumed, and replaced by a new holder with a fresh composition containing chemical compounds for reducing aging. The holder would thus be able, for example, to hold the composition, for instance thermally upgraded paper, such that it remains mobile through a flow of the coolant, similarly to a teabag in water.

Alternatively or additionally to disposing of the composition in free, especially releasable, form within the housing and all within a pipeline of the cooling circuit, it may also be the case that the composition is mounted on at least one part made of cellulosic insulation material that surrounds the winding and/or the electrical conductor thereof for insulation purposes, especially between two parts made of cellulosic insulation material. In this case, the composition is already introduced into the assembly in the production of the assembly and can generally no longer be removed therefrom once the arrangement has been assembled or put into operation. The parts made of cellulosic insulation material are preferably parts made of pressboard material between which the composition is introduced.

The composition may either again comprise an additional cellulosic insulation material, for example thermally upgraded paper. This could be clamped between two parts made of pressboard material. But the composition may also be applied directly as a chemical compound for reducing aging to an interface or surface of a part made of cellulosic insulation material, for example by painting or spraying. This surface is preferably adjoined by a second part made of cellulosic insulation material. The chemical compound is introduced in the course of production of the assembly, for example prior to the drying process, and can diffuse into the insulation material at appropriate temperature during drying, but can also be sucked out in part via the reduced pressure. This is because, in the process for production of a transformer, for instance, the active part (windings, installations), without the pot, is dried in a large drying system (oven). In the heating process, kerosene is usually used as heat carrier, then reduced pressure is used to remove both the residual moisture and the heat carrier again.

In one embodiment of the invention, the chemical compounds for reducing the aging of cellulosic insulation material include at least one of the following compounds: dicyandiamide, melamine, polyacrylamide. These compounds are known from the production of thermally upgraded paper; see, for example, the Insuldur® method.

The invention also relates to a method of reducing the aging of cellulosic insulation material of a winding, wherein the winding includes at least one electrical conductor, wherein the winding and/or the electrical conductor thereof is at least partly surrounded by a cellulosic insulation material and wherein the winding is within a liquid coolant in the state of operation. It is envisaged here that—in addition to the cellulosic insulation material present that surrounds the winding and/or the electrical conductor thereof for insulation purposes—at least one composition containing chemical compounds for reducing the aging of cellulosic insulation material is added to the liquid coolant and/or to existing cellulosic insulation material.

In principle, the composition may be added in solid and/or liquid form. If the composition is added in liquid form, for instance as a solution, it should be taken into account that the chemical compounds present in the composition have a correspondingly good solubility in the coolant.

What is meant by the addition of the composition in solid form is that the chemical compounds for reducing aging are either added in solid form themselves or are bound to a composition in the form of a solid. In the latter case, in one embodiment of the invention, the composition comprises an additional cellulosic insulation material that has been provided with chemical compounds for reducing the aging of cellulosic insulation material. This composition may, for instance, be thermally upgraded paper.

The time of addition of the composition containing chemical compounds for reducing aging and the amount added may depend on the consumption of these chemical compounds in the existing insulation material. By addition of paper and pressboard material samples—without thermal upgrading—it is possible to check the content of the thermal upgrading components by removing these samples. From the point of view of easier sampling, given adequate sensitivity of the coolant analysis (oil analysis), the content of the chemical compounds for reducing aging in liquid coolant can be monitored, in which case any determination of the temperature dependence of the solubility equilibrium between cellulose and coolant can be used to better assess the component measured in the coolant.

As already elucidated in connection with the assembly of the invention, the composition can be added at a position where there is a hot region of the coolant in the state of operation. It is likewise possible, for the method of the invention, to use those chemical compounds for reducing the aging of cellulosic insulation material that have already been mentioned in connection with the arrangement of the invention.

An alternative or additional means of adding a composition during the operation of the winding is to add the composition to existing cellulosic insulation material during the production of the winding, i.e. prior to the operation of the winding. For this purpose, there are in principle three non-exclusive methods:

The composition can be applied to at least one part made of cellulosic insulation material that surrounds the winding and/or the electrical conductor thereof for insulation purposes prior to any process of drying the winding, especially between two parts made of cellulosic insulation material. The chemical compound here may, for instance, be applied to at least one part made of cellulosic insulation material. The chemical compound can then penetrate into the insulation material by virtue of the heat in the course of drying.

Or the composition can be added to the heat carrier for the drying in the course of a process of drying the winding. The winding is heated with a heat carrier, usually with kerosene, in the course of drying in a closed drying system (oven). Subsequently, residual moisture and heat carrier are removed again from the drying system by means of reduced pressure. It would thus be possible to add the chemical compounds for reducing aging to the heat carrier in dissolved form. The chemical compounds are taken up by cellulosic insulation material present and can penetrate deeper into or be distributed in the insulation material during the drying and later in the operation of the winding.

Or the composition is added to the air that is guided into the drying system after a process of drying the winding. After the drying, both the residual moisture and heat carrier are removed by reduced pressure, then air can flow back into the drying system. The chemical compounds for reducing aging are added to this air, and these compounds can then be deposited on existing cellulosic insulation material and penetrate into the insulation material that is still hot from the drying or diffuse into it later from the surface of the insulation material in the operation of the winding, or be transported to and penetrate into other parts made of insulation material via the coolant in operation.

The invention makes it possible to reduce the degradation of any thermally upgrading components present in the insulation paper and/or to add the thermally upgrading components to liquid coolant elsewhere, which enables application both for new and existing transformers or inductors.

BRIEF DESCRIPTION OF THE SEVERAL VIEWS OF THE DRAWING

For further elucidation of the invention, the part of the description that follows makes reference to the figures, from which further advantageous details and possible fields of use of the invention can be inferred. The figures should be considered by way of example and should set out the character of the invention but in no way restrict it or even describe it in a confining manner. The figures show.

DETAILED DESCRIPTION OF THE INVENTION

Figure 1:
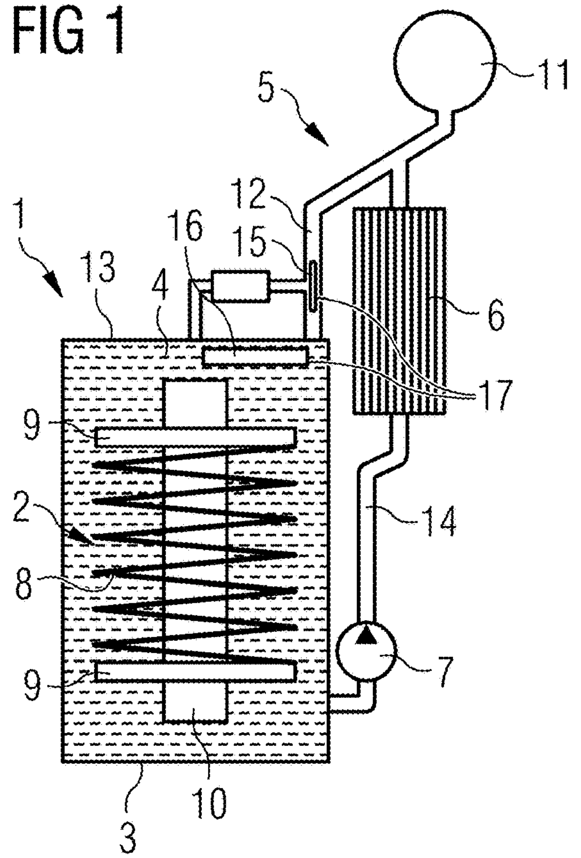
FIG. 1 a schematic diagram of a transformer.

FIG. 1 shows a schematic diagram of a transformer 1. The transformer 1 of the invention has multiple transformer windings, of which only one transformer winding 2 is shown here, which is wound around a core 10. This arrangement corresponds to the core-type design. There is also a shell-type design which has a very similar pattern of behavior and to which the invention can likewise be applied. In addition, the transformer 1 has a housing 3 filled with a liquid coolant 4. The upper part of the housing 3 is formed by a lid region, called lid 13 for short hereinafter. There are usually flanges mounted in the lid 13 in order to have local access to the interior of the housing for servicing activities for example.

For accommodation of the coolant 4 at high temperatures, an expansion vessel 11 is provided here, which is connected to the housing 3 via a pipeline 12. A cooling circuit 5 is disposed between the expansion vessel 11 and housing 3. As well as the expansion vessel 11, said cooling circuit 5 comprises pipelines 12, 14, one or more cooling elements 6 (radiators here), and a pump 7 (not obligatory). The pipeline 12 that leads from the lid 13 of the housing 3 to a cooling element 6 introduces the hot coolant 4 into the cooling element 6. The cooled coolant 4, optionally via a pump 7, is conveyed from the cooling element 6 back into the housing 3, generally close to the bottom.

The conductor 8 of the transformer winding 2 is wrapped with paper, for example thermally upgraded paper. Spacers made of pressboard material are often present between the coils of each winding 2; there are also cylinders and other parts made of pressboard material that serve for electrical insulation in, around and between the windings 2 and the core 10 etc., and enable access of the coolant 4 to voltage-bearing parts. The accompanying press device that compresses the transformer winding 2 in vertical direction is not shown in FIG. 1; all that are shown are cellulosic pressboards 9. In addition to the paper that may already have been thermally upgraded, with which the conductor 8 has been wrapped, an additional composition 16 containing chemical compounds for reducing the aging of cellulosic insulation material, for example thermally upgraded paper, is held in a holder 17 in the housing 3, specifically in the region of the lid 13, for example on the underside thereof, such that the composition 16 can be introduced and removed again in a simple manner from the top, for instance by opening a device in the lid 13. The composition 16 is best mounted close to the pipeline 12 in the lid 13 because there is an appropriate flow rate of the coolant 4 there. On opening of the device in the lid 13, it should be ensured that the pipeline 12 to the expansion vessel 11 is closed, in order to prevent outflow of the coolant through the device in the lid 13. But it would also be possible for the composition 15—alternatively or additionally—to be mounted directly in the pipeline 12 that leads to the radiator 6. The thermally upgrading substances present in the composition 15, 16 are introduced into liquid coolant and find their way to all liquid-wetted parts through the circulation of the coolant, i.e. including all insulation parts made of cellulose.

The chemical compounds for reducing the aging of cellulosic insulation material can then diffuse both into the thermally upgraded paper with which the conductor 8 has been wrapped and into the pressboard 9 and all other cellulosic parts. This firstly replaces the compounds that have already been degraded in the thermally upgraded paper of the conductor 8. Secondly, these compounds are deposited for the first time in the pressboard material of the pressboard 9, and hence reduce aging of the pressboard material.

Figure 2:
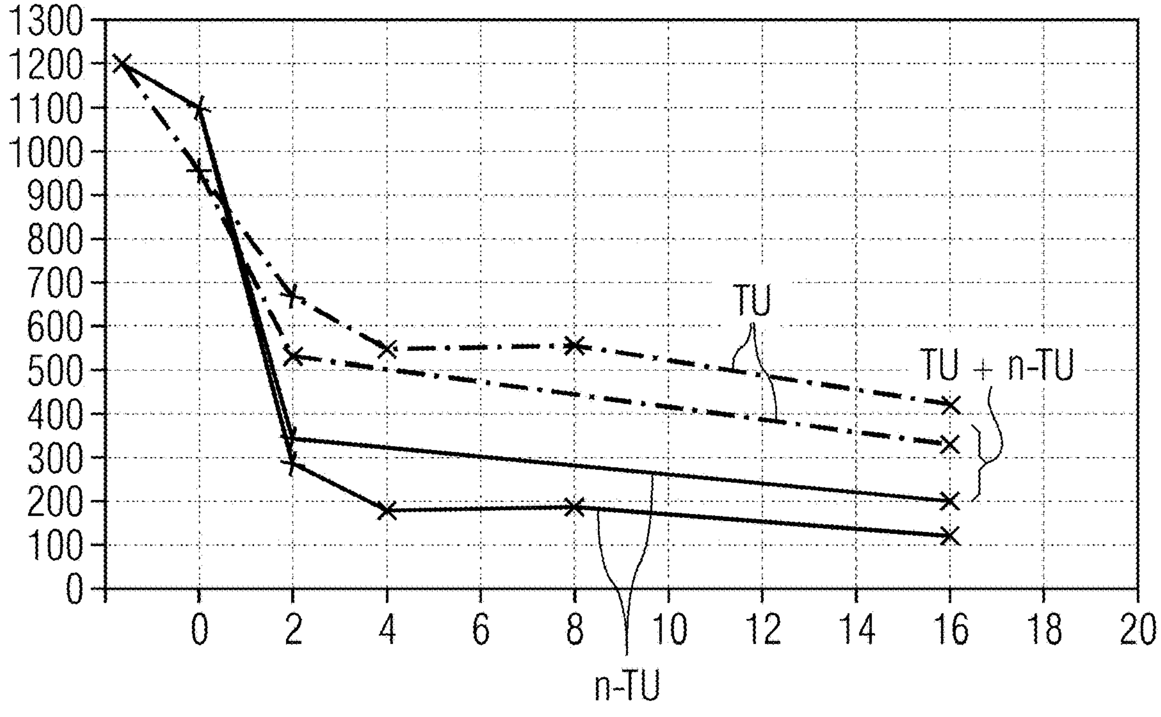
FIG. 2 experimental results for the aging of cellulosic insulation material.

FIG. 2 shows the results of aging experiments with different insulation materials. Plotted on the horizontal axis is the time in weeks, and on the vertical axis the level of polymerization of the cellulose in the respective materials. The level of polymerization of the cellulose is a measure of fiber strength and hence of the tensile strength of the material. The level of polymerization can be measured.

The uppermost curve shows the progression of the level of polymerization of a thermally upgraded paper (TU) over time, which has merely been placed into an oil bath at 140° C., the oil corresponding to the coolant of a transformer. The lowermost curve shows the progression of the polymerization level of a paper that has not been thermally upgraded (n-TU) over time, which has merely been placed into an oil bath at 140° C. It can be seen that the untreated paper ages much more quickly over a prolonged period than the treated, i.e. thermally upgraded, paper.

If both thermally upgraded paper and paper that has not been thermally upgraded are placed together into the oil bath at 140° C. (TU+n-TU), the thermally upgraded paper according to the second curve from the top—considered at week 16—shows a reduced level of polymerization compared to the thermally upgraded paper placed in on its own (uppermost curve). For the paper that has not been thermally upgraded, by contrast, according to the second curve from the bottom—considered at week 16—the resultant level of polymerization is elevated compared to the paper that has not been thermally upgraded and is placed in on its own (lowermost curve). The thermally upgraded paper thus loses the chemical compounds that reduce aging when the two are placed in together, whereas these compounds accumulate in the paper that had not been thermally upgraded beforehand. The balancing is thus effected by the transfer of the coolant, i.e. usually the insulation oil, since the solid parts are in direct contact only to a limited degree, if at all.

LIST OF REFERENCE NUMERALS

1 transformer
2 (transformer) winding
3 housing
4 liquid coolant
5 cooling circuit
6 cooling element (radiator)
7 pump
8 conductor of the transformer winding
9 pressboard
10 core
11 expansion vessel
12 pipeline
13 lid of the housing 3
14 return tube
15 composition comprising chemical compounds for reducing the aging of cellulosic insulation material (thermally upgraded paper)
16 composition comprising chemical compounds for reducing the aging of cellulosic insulation material (thermally upgraded paper)
17 holder

The invention claimed is:

1. An assembly, comprising:
a housing filled with a liquid coolant during operation;
a cooling circuit for the coolant;
a cooling element or radiator disposed outside said housing;
said cooling circuit including a pipeline connecting said housing to said cooling element or radiator for supplying said cooling element or radiator with heated coolant;

at least one winding disposed in said housing and disposed within the liquid coolant during operation, said at least one winding including at least one electrical conductor;

a cellulosic insulation material at least partly surrounding at least one of said at least one winding or said electrical conductor of said at least one winding, for insulation purposes;

at least one composition in addition to said cellulosic insulation material at least partly surrounding at least one of said at least one winding or said electrical conductor of said at least one winding for insulation purposes;

said at least one composition disposed in at least one of said housing or said cooling circuit;

said at least one composition containing chemical compounds for reducing aging of said cellulosic insulation material;

said at least one composition being mounted at a position within said housing containing a region of the coolant being hotter than other regions of the coolant during operation; and said at least one composition disposed in said pipeline.

2. The assembly according to claim 1, wherein said at least one composition includes an additional cellulosic insulation material provided with chemical compounds for reducing the aging of cellulosic insulation material.

3. The assembly according to claim 2, wherein said at least one composition is a thermally upgraded paper.

4. The assembly according to claim 1, wherein said housing has a lid, and said at least one composition is disposed in a region of said lid.

5. The assembly according to claim 1, which further comprises a holder holding said at least one composition, said holder being releasably secured within at least one of said housing or said cooling circuit.

6. The assembly according to claim 1, wherein said at least one composition is mounted in said housing on at least one part, or between two parts, of said cellulosic insulation material at least partly surrounding at least one of said at least one winding or said electrical conductor of said at least one winding for insulation purposes.

7. An assembly, comprising:

a housing filled with a liquid coolant during operation;

a cooling circuit for the coolant;

at least one winding disposed in said housing and disposed within the liquid coolant during operation, said at least one winding including at least one electrical conductor;

a cellulosic insulation material at least partly surrounding at least one of said at least one winding or said electrical conductor of said at least one winding, for insulation purposes;

at least one composition in addition to said cellulosic insulation material at least partly surrounding at least one of said at least one winding or said electrical conductor of said at least one winding for insulation purposes;

said at least one composition disposed in at least one of said housing or said cooling circuit;

said at least one composition containing chemical compounds for reducing aging of said cellulosic insulation material;

said at least one composition being mounted at a position within said housing containing a region of the coolant being hotter than other regions of the coolant during operation; and wherein said chemical compounds for reducing the aging of said cellulosic insulation material include at least one of dicyandiamide, melamine, or polyacrylamide.

* * * * *